(12) United States Patent
Hoey et al.

(10) Patent No.: US 8,397,077 B2
(45) Date of Patent: Mar. 12, 2013

(54) CLIENT SIDE AUTHENTICATION REDIRECTION

(75) Inventors: Thomas J. Hoey, Amherst, NH (US); Gregg Browinski, Amherst, NH (US)

(73) Assignee: PistolStar, Inc., Amherst, NH (US)

( * ) Notice: Subject to any disclaimer, the term of this patent is extended or adjusted under 35 U.S.C. 154(b) by 835 days.

(21) Appl. No.: 12/108,922

(22) Filed: Apr. 24, 2008

(65) Prior Publication Data

US 2009/0150991 A1    Jun. 11, 2009

Related U.S. Application Data

(60) Provisional application No. 61/012,167, filed on Dec. 7, 2007, provisional application No. 61/012,086, filed on Dec. 7, 2007.

(51) Int. Cl.
*G06F 21/00* (2006.01)

(52) U.S. Cl. ...................................................... 713/184

(58) Field of Classification Search .................. 713/184, 713/183; 726/18
See application file for complete search history.

(56) References Cited

U.S. PATENT DOCUMENTS

| | | | |
|---|---|---|---|
| 5,241,594 A | 8/1993 | Kung | |
| 5,684,950 A | 11/1997 | Dare et al. | |
| 5,944,824 A | 8/1999 | He | |
| 6,006,333 A | 12/1999 | Nielsen | |
| 6,178,511 B1 | 1/2001 | Cohen et al. | |
| 6,243,816 B1 | 6/2001 | Fang et al. | |
| 6,668,323 B1 | 12/2003 | Challener et al. | |
| 7,055,032 B2 | 5/2006 | Sandhu et al. | |
| 7,246,230 B2 | 7/2007 | Stanko | |
| 7,272,231 B2 | 9/2007 | Jonas et al. | |
| 7,313,816 B2 | 12/2007 | Sinha et al. | |
| 2002/0002678 A1 | 1/2002 | Chow et al. | |
| 2003/0131266 A1* | 7/2003 | Best et al. | 713/202 |
| 2003/0188193 A1 | 10/2003 | Venkataramappa | |
| 2003/0217288 A1 | 11/2003 | Guo et al. | |
| 2003/0226036 A1 | 12/2003 | Bivens et al. | |
| 2004/0025026 A1 | 2/2004 | Karp et al. | |
| 2004/0158743 A1* | 8/2004 | Ham et al. | 713/201 |
| 2005/0108521 A1 | 5/2005 | Silhavy et al. | |
| 2005/0108579 A1* | 5/2005 | Isaacson et al. | 713/202 |
| 2005/0138399 A1 | 6/2005 | Cheston et al. | |
| 2005/0144463 A1 | 6/2005 | Rossebo et al. | |
| 2006/0085845 A1 | 4/2006 | Davis et al. | |
| 2006/0107064 A1 | 5/2006 | Fiske | |
| 2006/0206926 A1 | 9/2006 | Luo et al. | |
| 2006/0230438 A1 | 10/2006 | Shappir et al. | |
| 2006/0236382 A1 | 10/2006 | Hinton et al. | |

(Continued)

FOREIGN PATENT DOCUMENTS

| KR | 2002085734 | 11/2002 |
|---|---|---|
| KR | 2003033630 | 5/2003 |

OTHER PUBLICATIONS

The NT Local Administrator and Shared Passwords, Daniel Marvin, Apr. 2, 2001, http://www.securityfocus.com/print/infocus/1353.

(Continued)

*Primary Examiner* — Ellen Tran (74) *Attorney, Agent, or Firm* — Bourque and Associates, PA (57) ABSTRACT

A device, method and system for authentication by a user are disclosed herein. The exemplary method may authenticate a user password entered by a user. User specific attributes may be accessed and used to produce a generated password. The generated password may be produced using an algorithm and the user attributes. The generated password may be used to log onto a resource for the user.

14 Claims, 6 Drawing Sheets

U.S. PATENT DOCUMENTS

| | | |
|---|---|---|
| 2006/0288230 A1 | 12/2006 | Crall et al. |
| 2007/0006291 A1 | 1/2007 | Barari et al. |
| 2007/0061561 A1 | 3/2007 | Hashiguchi |
| 2007/0107049 A1 | 5/2007 | Guo |
| 2007/0157032 A1 | 7/2007 | Paganetti et al. |
| 2007/0186115 A1 | 8/2007 | Gao et al. |
| 2007/0245150 A1 | 10/2007 | Lu et al. |
| 2007/0250920 A1* | 10/2007 | Lindsay .......................... 726/7 |
| 2007/0255943 A1* | 11/2007 | Kern et al. ................. 713/155 |
| 2007/0283161 A1 | 12/2007 | Yami |
| 2007/0300077 A1 | 12/2007 | Mani et al. |
| 2008/0005577 A1 | 1/2008 | Rager et al. |
| 2008/0114980 A1* | 5/2008 | Sridhar ...................... 713/168 |

OTHER PUBLICATIONS

Leverage Active Directory with Kerberos to Eliminate HTTP Password SSO to Domino, Sametime, and QuickPlace, White Paper, PistolStar, Inc., Amherst, NH, 2007.

Single sign-on for SAP with Tivoli Access Manager and Microsoft Windows, Peter Tuton, Aug. 17, 2006, IBM website.

PistolStar Intros Password Power Plug-In for Lotus Sametime Single Sign-On via Kerberos, Nov. 15, 2007, TMCnet News (Wireless News Via Thomson Dialog NewsEdge).

PistolStar Enables Lotus Sametime Single Sign-On Via Kerberos, Nov. 6, 2007, Netnewsletter Journal, Market Wire.

\* cited by examiner

```
┌─────────────────────────────┐
│     Generate Password       │
│            502              │
└─────────────┬───────────────┘
              ▼
┌─────────────────────────────────────────┐
│ Read a random seed value from a field   │
│       in the user specific attributes   │
│                  504                    │
└─────────────┬───────────────────────────┘
              ▼
┌─────────────────────────────────────────┐
│ Use the random seed with a cascaded     │
│ hash operation using multiple algorithms│
│ to produce a concatenated and encoded   │
│ value                                   │
│                  506                    │
└─────────────┬───────────────────────────┘
              ▼
┌─────────────────────────────────────────┐
│         Truncate the value              │
│                  508                    │
└─────────────┬───────────────────────────┘
              ▼
┌─────────────────────────────┐
│      Process complete       │
│            510              │
└─────────────────────────────┘
```

CLIENT SIDE AUTHENTICATION REDIRECTION

CROSS-REFERENCE TO RELATED APPLICATIONS

This application claims priority to U.S. Patent Application No. 61/012,167 filed Dec. 7, 2007, entitled Password Generation, and U.S. Patent Application No. 61/012,086 filed Dec. 7, 2007, entitled Single Sign-On, which are incorporated fully herein by reference.

TECHNICAL FIELD

The present invention relates to password generation and more particularly, relates to user authentication and user password maintenance.

BACKGROUND INFORMATION

In complex computing environments, passwords are often the source of frustration, wasted time and unnecessary expense. Users regularly access about eight to ten different systems. This frustrates users by requiring them to remember too many passwords, having multiple password prompts and the chore of resetting their passwords when they forget them. For example, employees in companies using IBM Lotus applications typically have numerous password prompts. Passwords are needed to access Microsoft Windows® as well as Domino HTTP sessions such as Lotus Domino® Web Access ("iNotes®"), Sametime®, QuickPlace®, and Domino Web applications. Users are often so afraid they will not be able to get back in or utilize a resource in the future, they leave the figurative key in the door, with weak passwords like "password" or sticky notes posted all over their cubicles. With the increase in remote access and demand for greater resource access by members, security issues are becoming a greater concern and bigger challenge. Dictionary attacks, hacking and other vulnerabilities caused by poor password quality are putting sensitive information and/or resources at risk.

Laws and regulations governing corporate data and privacy such as Sarbanes-Oxley in the United States and the European Data Directive further complicate the network security problem. At the same time a company is investing in strong security systems such as identity management, users create new points of exposure. If corporate systems and confidentiality are breached as a result of poor password policy, the company may be sanctioned despite its best IT efforts.

In addition to security risks, IT management and staff are often overworked and understaffed—too many help-desk calls and forgotten passwords, too many applications and systems to manage and too many users with passwords posted on their monitors for everyone to see. Lost or forgotten passwords represent substantial workloads for IT management help-desk calls. IT resources may be wasted on maintenance of an IT system rather than expanding the IT capabilities and/or tools.

SUMMARY

The present invention is a novel device, system, and method for regulating networks using user authentication and resource security. The exemplary method may authenticate a user password entered by a user. User-specific attributes are accessed and used to produce a generated password. The generated password is produced using a private algorithm and the user attributes. The generated password is then used to log onto a resource for the user.

In another exemplary embodiment, the generated password is registered with the resource for a user after specified actions. In another exemplary embodiment, a user password may be modified without modification of the private algorithm or the user specific attributes. In yet another exemplary embodiment, algorithms may read a random seed value from a field in the user specific attributes, use the random seed with a cascaded hash operation using multiple algorithms to produce a concatenated and encoded value, and truncate the value. In another exemplary embodiment, the generated password is made up of multiple general, local, external, and fixed user specific attributes.

Embodiments of the invention may have one or more of the following advantages. Embodiments of the invention may synchronize the many passwords needed for various platforms and applications. Embodiments of the invention may streamline the logon process and expedite access to the enterprise. Embodiments of the invention may help provide customizable security rules for password quality and expiration. Embodiments of the invention may allow end-users to only have to remember one password instead of several, and make changes to only one password in one place. Embodiments of the invention may be simple to execute, but allow end-users to authenticate from a browser and not require a complicated client installation.

The present invention is not intended to be limited to a system or method that must satisfy one or more of any stated objects or features of the invention. It is also important to note that the present invention is not limited to the exemplary or primary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION

Embodiments of the present invention may be used to monitor and control authentication and passwords among various applications and platforms. After authenticating a password entered by the user, embodiments of the invention may utilize attributes related to the user as a seed to generate a more complex generated password using secure algorithms.

The generated password may then be used to log into resources or authenticate the user with resources on the user's behalf.

Figure 1:
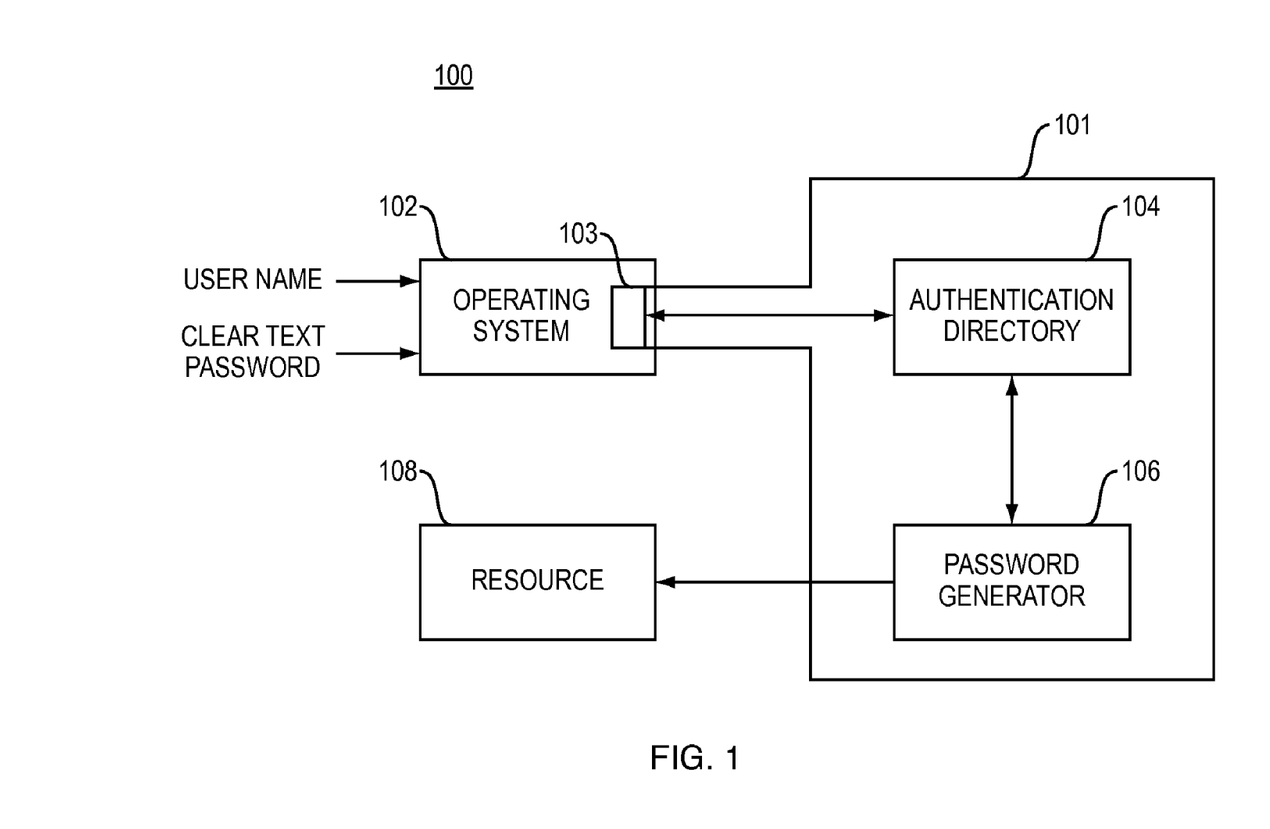
FIG. 1 is an exemplary block diagram of a computer system 100 demonstrating the interaction of components of the system according to the present invention.

Referring to FIG. 1, an exemplary block diagram of a computer system 100 demonstrates the interaction of components of the system. The computer system 100 may be an individual desktop, server, or other device, which utilizes authentication by the user. In order to gain access to the computer system 100 an operating system 102, for example, Microsoft Windows®, prompts the user via Ctrl-Alt-Del to enter a password. Each user may be assigned a username, domain, and clear-text password prior to logging on to the computer system 100. Once the user enters the username and the clear-text password, the entered password and username are verified against the password and username stored in an authentication directory 104 by a password redirector potion 103 of an automated authentication redirection process 101 operating under control of a computer operating system. The authentication directory 104 may be, for example, Active Directory for Windows-based computers. If the entered password and username are verified as correct, the user is given access to the computer system 100 by the operating system.

Once authenticated a password generator 106 may produce a generated password. The password generator 106 accesses attributes to provide a seed that is used to produce the generated password. These attributes may be specific to the user. The specific attributes may be local or external attributes. Internal attributes may include, for example but not limited to, the user's entered password, username, or domain, existing attributes or random keys in an account directory or database. External attributes may include, for example but not limited to, a MAC address of a network card, a serial number of a computer's hard drive, a key on or attribute of a USB token or smart card. Specific attributes may also include attributes associated with a group with which the user is affiliated. Although attributes that may periodically change may be used, care may need to be taken to avoid changes between generation and registration of a generated password. For example, alteration to a user password may require a generation of a new generated password as will be understood by embodiments described later herein.

The password generator 106 may use one or a combination of multiple attributes to produce the seed value. The seed value goes through a series of actions to produce a relatively random value that may be utilized as the generated password. Algorithms associated with password generator 106 may perform the actions. The algorithms may be confidential and identifiable. The actions may prohibit reverse-engineering of either the algorithms or attributes.

In one embodiment a random seed value may be used as an attribute or in combination with other attributes. In this embodiment, reverse-engineering may be more prohibitive due to the random value. The random seed may be a quasi-random seed generated by an operating system or application. The random seed value may be combined with other attributes prior to application of the algorithms or in combination with the algorithms. The random seed value may be produced each time the use enters a password, providing a new random generated password each time the user registers. The algorithms may also periodically change to further prevent identification. The random seed value may be stored locally and securely between generation of a new random seed. This allows regeneration of the generated password between generations of new random seeds.

Once the password is generated, the password generator 106 registers the generated password with a resource 108. The resource 108 may be, for example but not limited to, an application, another operating system, a device, a server or a module. Once registered with the resource 108 the user may use the generated password to log into the resource 108 and gain access to the resource 108. The operations of registration or logging onto a resource using the generated password may be carried out by the password generator 106 or may be carried out by independent and/or separate modules.

The registration may occur whenever a password is generated or independently from password generation. For example, the registration may occur each time a password is generated or only when the user accesses or logs into the resource. In this example, a new generated password may be used each time the user logs into a resource 108. In other examples, the resource may register the generated password on a routine basis or by trigger of an external event, for example, request by administrator or user, multiple unsuccessful logins, a predetermined time interval or number of logins.

The registration or logging into a resource 108 may be recognized, transparent, or a hybrid to the user. For example, the user may not even be aware that the user is logging into a resource 108 when the user accesses the resource 108. In another example, the user may be prompted by the resource 108 to enter a username and password. The user may enter both items but be unaware that the entered password is replaced by the generated password and the generated password is actually used to log into the resource 108. In yet another example, the user may be presented with a specific prompt produced by the password generator 106 or other component.

The generated password may use complex sequences and codes that may not be feasible for an individual user to memorize or efficiently enter when prompted. The generated password may be stored locally within the authentication directory 104 or may not be stored and may be generated on the fly each time a log-on event occurs. The algorithms and attributes used to produce the generated password may be specific to a user or group of users. The algorithms and attributes may even be specific to each session of a user. The generated password may also be tailored to maximize the complexity of the generated password allowed by the resource.

The following is an example of such operation wherein the generated password is utilized by an example resource, Lotus Notes® ID running in a Windows operating environment.
1. A plug-in may bind to Active Directory (AD) as the end user via Lightweight Directory Access Protocol (LDAP).
2. An LDAP search may be performed to find the user's AD account.
3. The random seed value may be read from the configurable field in that account.
4. For a first time use, the seed value may not exist in the user's account.
   a. The 512-bit random seed may then be generated with the Microsoft Crypto API. It may be represented as 64 hexadecimal characters.
   b. This value may be written to the field under the same LDAP session.
   c. The 512-bit value may be passed back to use as the primary seed in the password generation algorithm.
5. The random seed may be used with cascaded hash operations using the SHA-1, MD5, and proprietary Lotus Notes® @Password algorithms in addition to a proprietary mechanism. Each hash operation may use different static salt values and the result of the previous hash operation.

6. The results of all three hashes may be concatenated and base64 encoded to ensure a larger character namespace (64 possible values per character verses 16 for hexadecimal values).
7. The resulting base64 encoded value may be truncated at 63 characters—the maximum length for a Notes ID password.
8. The generated password may now be based on a random, protected value and has $64^{63}=6.16*10^{113}$ possible values.

The components of the exemplary computer system 100 may use libraries, executable files and plug-ins to carry out the embodiments of the invention. The exemplary computer system 100 provides a block diagram for demonstrating action and components of the system. Although the exemplary block diagram utilizes a computer system 100, it is understood that various components and actions may be substituted or performed externally as discussed in greater detail later herein.

Figure 2:
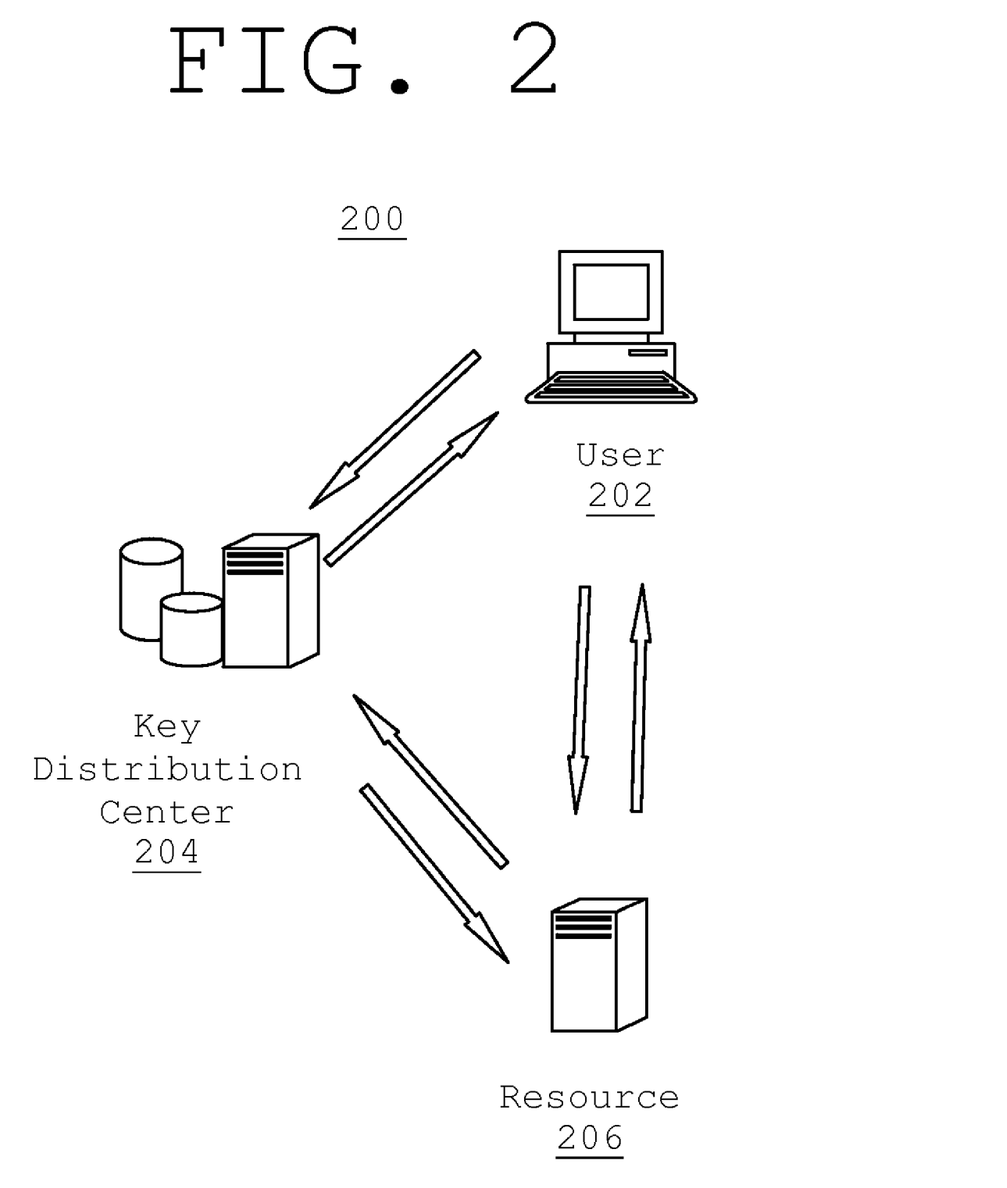
FIG. 2 is an exemplary network diagram demonstrating the interaction of components according to the present invention.

Referring to FIG. 2, an exemplary network diagram demonstrates the interaction of components in a possible network environment. The exemplary network diagram 200 provides the interaction of components as previously discussed with regard to FIG. 1 on a network scale. The network 200 may have a user desktop or other access point 202, a key distribution center or server 204 and a resource 206. The resource 206 may be, for example, an email server or web server. The user may be prompted to log onto the network at the user's desktop 202. The key distribution center 204 may verify the user's clear-text password and other attributes, for example, the MAC address of the user's desktop 202 and a smartcard connected to the user's desktop 202. When the user goes to access the resource 206, for example, the email server, user's desktop 202 or the key distribution center 204 may generate a password using the MAC address, a random seed value, the username and smartcard ID as attributes to generate the password. The generated password may then be registered with the resource 206 by the user's desktop 202 or the key distribution center 204. The user's desktop 202 or key distribution center 204 may then log the user 202 into the email server using the generated password. The generated password may only be stored within the confines of the key distribution center 204 or may not be stored anywhere and generated each time a user attempts to access a resource 206.

As should be understood by the previous examples provided in FIGS. 1 and 2, the exemplary embodiments may be implemented in a variety of computer software, firmware, hardware, digital electronic circuitry, or in combinations of them. The exemplary embodiments described herein can be implemented as a computer program product, i.e., a computer program tangibly embodied in an information carrier, e.g., in a machine-readable storage device or in a propagated signal, for execution by, or to control the operation of, a communications processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, library, or other unit suitable for use in a computing environment. A computer program can be deployed to be executed on one computer or on multiple computers at one site or distributed across multiple sites and interconnected by a communication network.

Figure 3:
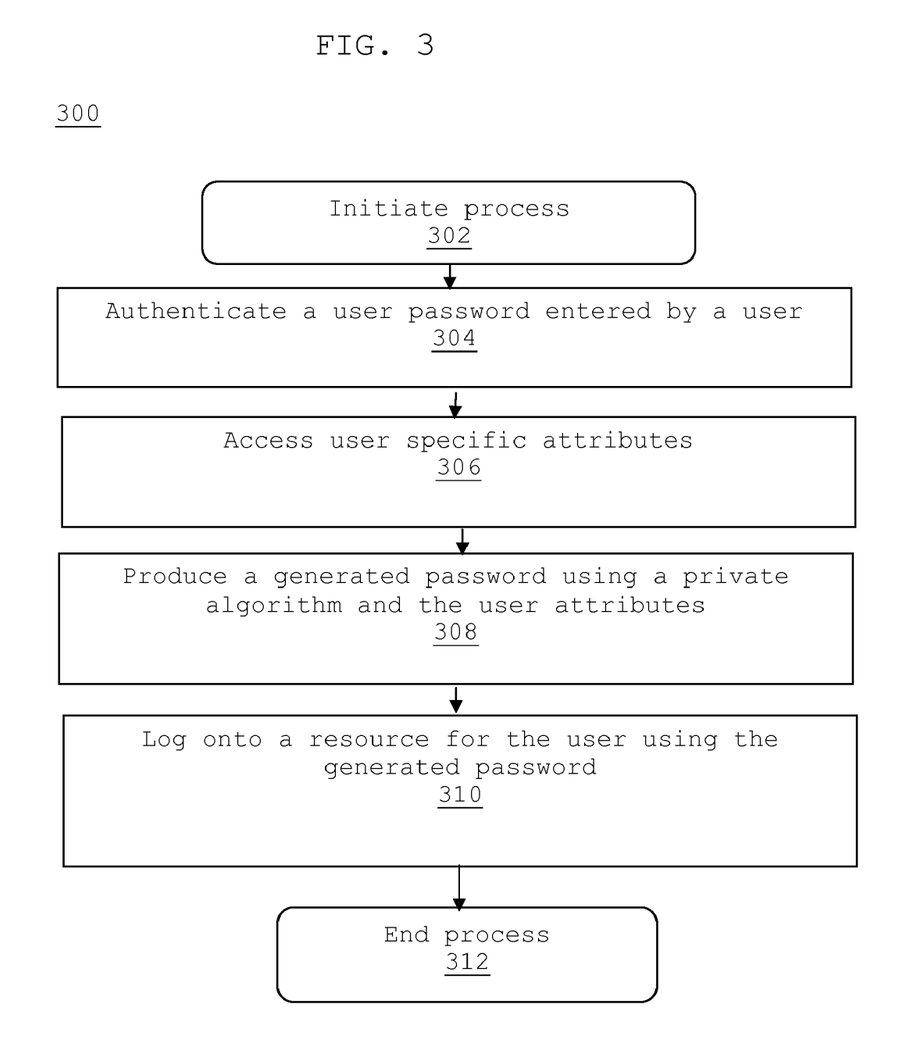
FIG. 3 is a flow chart illustrating an exemplary embodiment used for generating a password according to the invention.

Referring to FIG. 3, an exemplary method 300 may be used to generate a password according to an embodiment of the invention. The process of generating a password may be initiated by a variety of actions (block 302). The action may include, for example, a user logging onto an operating system or application, a user logging onto a network. The password is entered by the user and authenticated against an existing password (block 304). The entered password may be, for example, a clear-text password, an ID generated from a USB token or smartcard, or an ID associated with a specific entry point. After proper authentication, attributes specific to the user are accessed to generate a seed value for generating the password (block 306). As previously discussed the attributes may be a variety of items.

It is appreciated that the attributes may need to remain constant between registrations of a generated password. For example, a text attribute in an active directory may be required to have read only access or restricted access to prevent generating and logging onto a resource with a generated password different from a generated password previously registered with the resource. This issue may be addressed by causing the generation and registration of a new generated password each time the text attribute is changed. In addition, algorithms used to generate the new generated password may also change to prevent reverse-engineering of the algorithms or attributes. For example, an encrypted connection to AD via LDAPS/SSL may be used to protect against sniffing the attribute value on the network. It should be understood that these are examples, and other actions and procedures may be used to address this and similar issues.

A generated password is produced using one or more algorithm and the user attributes (block 308). As previously discussed these algorithms may be wholly or partially private to prevent reverse-engineering of the attributes or algorithms. The generated password is registered with the resource allowing the user to log onto the resource using the generated password (block 310). The password generation process is complete (block 312) and may be used in conjunction with the various registration and logging process described with regard to FIGS. 4A, 4B, and 4C.

Figure 4A:
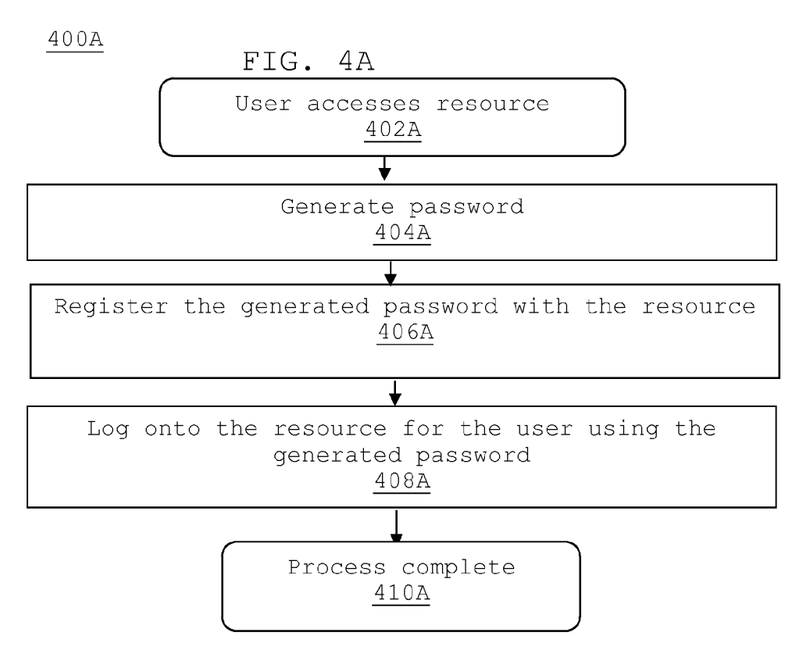
FIG. 4A, 4B, and 4C are flow charts illustrating an exemplary embodiment used for generating, registering, and logging a password according to the invention.

Referring to FIG. 4A, an exemplary embodiment demonstrating an on-the-fly password generation is shown (embodiment 400A). The user attempts to access the resource (block 402A). Assuming the user has been authenticated by a previous user password, the password is generated each time the user attempts to access the resource (block 404A). Once generated, the generated password is registered with the resource (block 406A). The generated password is used to log the user into the resource (block 408A). The process is complete (block 410A) and initiated each time the user attempts to access the resource. According to this exemplary embodiment, the generated password may change each time the user accesses a given resource. The change in password may be due to either an algorithm or attribute. Additionally, the generated password may not be stored providing additional security.

Figure 4B:
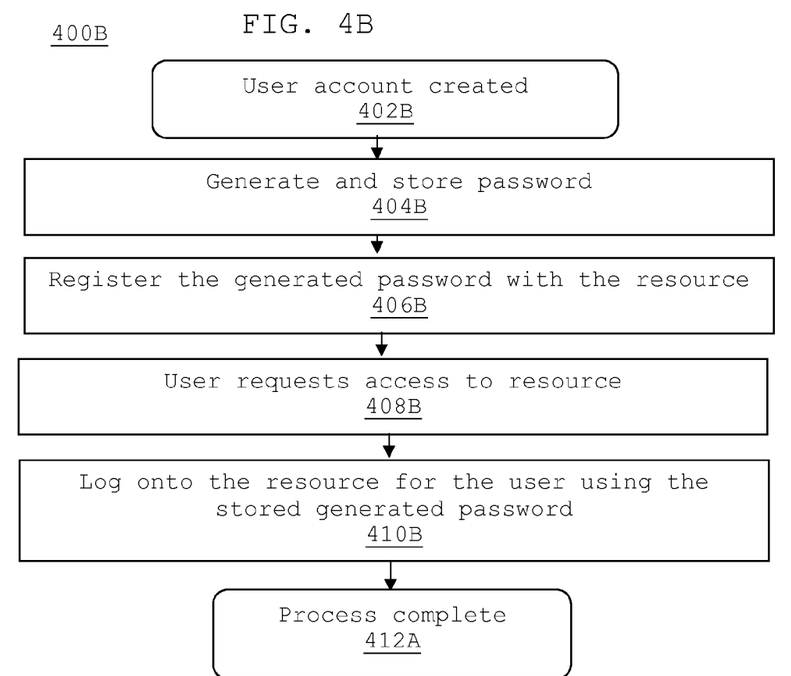

Referring to FIG. 4B, an exemplary embodiment demonstrating a stored password generation is shown (embodiment 400B). An administrator creates or modifies a user account in the active directory (block 402B). Recognizing the new account, the password is generated (block 404B). Once generated, the generated password is registered with the resource (block 406B). At some point later in time the user may request access to a resource (block 408B). The stored attributes and algorithm are used to generate the same previously generated password. The generated password is used to log the user into the resource (block 410B). The process is complete (block 412A). According to this embodiment, the generated password may be generated or controlled by the administrator.

Figure 4C:
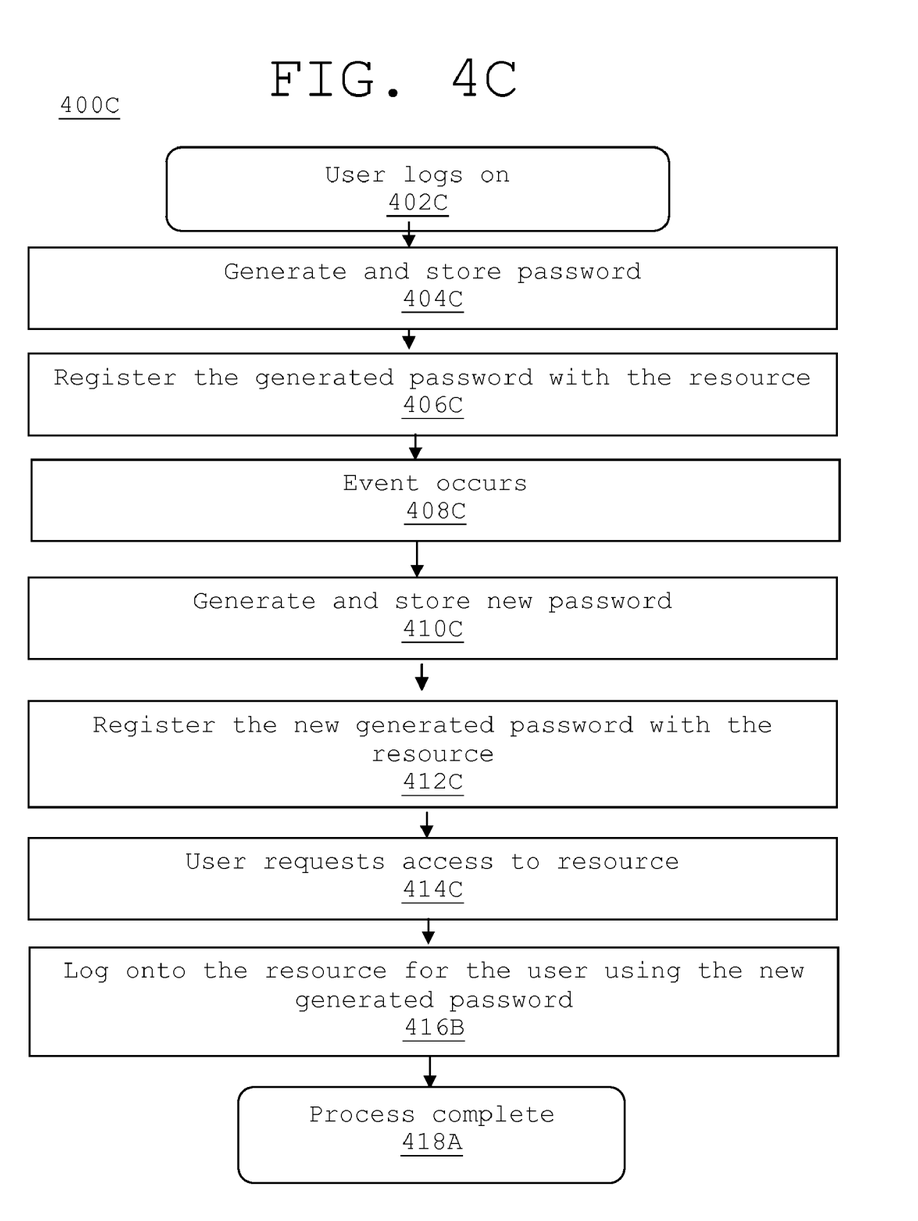

Referring to FIG. 4C, an exemplary embodiment demonstrating a stored and multiple password generation is shown (embodiment 400C). The user logs into an account using a password (block 402C). A password is generated using attributes stored in a field of the active directory (block 404C). Once generated, the generated password is registered with the resource (block 406C). An event triggers the erasing of the generated password (block 408C). The event may be, for example, multiple failed log-on attempts by the resource, the end of the business day, a system wide reset, or a sequence of suspicious events. A new password is generated based on different attributes stored in a field of the active directory (block 410C). Once generated, the newly generated password is registered with the resource (block 412C). The user may request access to a resource (block 414C). The newly generated password is used to log the user into the resource (block 416C). The process is complete (block 418C).

Figure 5:
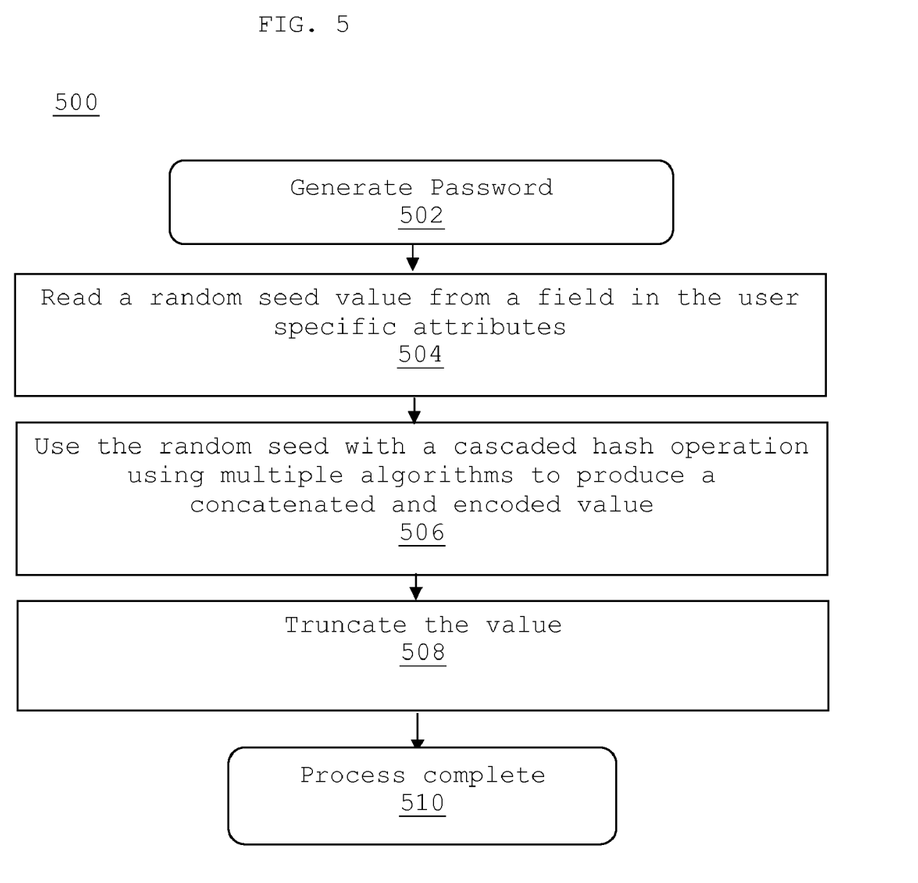
FIG. 5 is a flow chart illustrating an exemplary embodiment of multiple algorithms for generating a password according to the invention.

Referring to FIG. 5, an exemplary embodiment demonstrating multiple algorithms for generating a password is shown (embodiment 500). As previously discussed, the generation of a password is triggered by the system (block 502). A random seed value may be read from a field in the user specific attributes (block 504). This may include combining the random seed values with one or more user specific attributes, for example, a combination of username, domain of desktop, and MAC address of desktop may be used to generate a seed value provided to the algorithms. A cascaded hash operation using multiple algorithms may be applied to the seed value to produce a concatenated and encoded value (block 506). The algorithms may include other operations to conceal the seed value. The algorithms may be both open and/or proprietary. The value is then truncated to produce the generated password (block 510). The value may use other methods to produce a final generated password that complies with the password requirements of a given resource. A variety of other actions may be taken to ensure the final generated password meets the requirements of a given resource password, for example, the addition of a key or other aspect common to all passwords of a resource.

Embodiments allowing the generation of the Recovery password using a randomly generated 512-bit seed value may be used rather than a publicly readable value as the primary input. It may be stored in each user's Active Directory (AD) account and the field in which to store it may be configurable. Utilizing a random, ACL-protected value ensures a user's recovery password cannot be generated offline by reverse engineering, for example, a Lotus Notes plug-in.

Modifications and substitutions by one of ordinary skill in the art are considered to be within the scope of the present invention, which is not to be limited except by the following claims.

The invention claimed is:

1. A computerized method for performing an automated client application login process for a user, the automated client application login process transparent to a user of the computer, the method comprising:

receiving, from a computer operating system, a user name and a clear-text password previously entered by a user for authenticating the user, wherein the act of performing an automated client application login process for a user includes accessing a pre-existing user authentication directory, the pre-existing user authentication directory including a plurality of password protected user specific attributes, each of the plurality of password protected user specific attributes associated with a user name and a clear-text password of one system user;

subsequent to authenticating the user, receiving a user request to access a password protected client application;

responsive to the user request, the automated authentication process invoking a password interceptor process, transparent to the user;

the password interceptor process configured for retrieving an administratively predefined set of user attributes from the pre-existing user authentication directory, and whereby the automated authentication process produces a generated client application password from at least one of the administratively predefined set of user specific attributes using a pre-defined algorithm;

responsive to producing the generated client application password, the automated authentication process registering the generated client application password with the password protected client application as an authorized password for the user to access the password protected client application; and wherein the computerized method next logs the authenticated user onto the password protected client application, transparent to the user, using the previously registered generated client application password.

2. The method of automated client application login of claim 1, wherein the pre-defined algorithm includes:

reading a random seed value from said user specific attributes in the user authentication directory;

using the random seed with a cascaded hash operation using multiple algorithms to produce a concatenated and encoded value; and truncating the concatenated and encoded value.

3. The method of automated client application login of claim 1, wherein the generated client application password is made up of a plurality of user specific attributes from said user authentication directory, and wherein the predefined algorithm conceals the user specific attributes.

4. The method of automated client application login of claim 1, wherein said user specific attributes comprise local attributes and general attributes.

5. The method of automated client application login of claim 1, wherein one of the user specific attributes is a random value.

6. The method of automated client application login of claim 5, wherein one of the user specific attributes is selected from the group consisting of:

a) a key encoded into a client application's binary files,
b) a MAC address of a network card of a user's computer, and
c) a serial number of a user's computer's hard drive.

7. The method of automated client application login of claim 1, wherein said user specific attributes comprise external attributes.

8. The method of automated client application login of claim 7, wherein said external attributes are selected from the group consisting of:

a) an existing attribute of a USB token,
b) a random key stored on a USB token,
c) an existing attribute of a Smart card,
d) a random key stored on a Smart card,
e) an existing attribute in an Account Directory,
f) a random key stored in an Account Directory,
g) an existing attribute in a database, and
h) a random key stored in a database.

9. The method of automated client application login of claim 1, wherein one of said plurality of user specific attributes of said plurality of user specific attributes includes an automated client application login process generated seed value.

10. The method of automated client application login of claim 9, wherein said seed value for each user is generated from a pre-defined set of user specific attributes from said plurality of user specific attributes in the pre-existing user authentication directory for each said respective user.

11. The method of automated client application login of claim 1, wherein said generated key is a non-clear-text password.

12. The method of automated client application login of claim 1, further comprising the act of:
resetting, by a user or administrator, a user clear-text password stored as one of a plurality of user specific attributes in said pre-existing user authentication directory, and wherein resetting said user clear text password does not affect said generated client application password.

13. A system for performing client side application authentication and password generation of a user accessing a password protected client application, the system comprising:
a client side application authentication module, operating under control of a computer operating system, and configured for: (1) receiving a user name and a clear-text password entered by a user to the computer operating system, the user name and password configured for identifying the user to the computer operating system, and upon receiving the user name and clear-text password entered by the user, the client side application authentication module configured for authenticating the user name and clear-text password by accessing a pre-existing user authentication directory, the pre-existing user authentication directory including a plurality of password protected user specific attributes, each of the plurality of password protected user specific attributes associated with a user name and a clear-text password of one system user; and for (2) receiving a user request to access a password protected client application, the user request directed to the password protected client application, the client side application authentication module further configured for, transparently to the user, intercepting the user request to access the password protected client application and for accessing the password protected user specific attributes in the pre-existing user authentication directory of the previously authenticated user;
a password generation module, responsive to the client side application authentication module, and configured for accessing (1) a user specific administratively predefined set of the password protected user specific attributes located in the pre-existing user authentication directory and (2) a pre-defined algorithm, and for producing a generated application password using the pre-defined algorithm and the user specific administratively pre-defined set of user specific attributes; and
an access module, responsive to the password generation module, and configured for registering the generated application password with the client application, and for transparently to the user providing the generated application to the client application thereby logging the user onto the client application using the generated password.

14. The system for performing client side application authentication and password generation of a user of claim 13, wherein the pre-defined algorithm of the password generation module is configured for:
reading a random seed value from a user specific attribute in the user authentication directory;
using the random seed with a cascaded hash operation using multiple algorithms to produce a concatenated and encoded value; and
truncating the concatenated and encoded value.

* * * * *